United States Patent [19]
Nordstrom et al.

[11] Patent Number: 6,078,970
[45] Date of Patent: Jun. 20, 2000

[54] SYSTEM FOR DETERMINING ADAPTER INTERRUPT STATUS WHERE INTERRUPT IS SENT TO HOST AFTER OPERATING STATUS STORED IN REGISTER IS SHADOWED TO HOST MEMORY

[75] Inventors: Gregory Michael Nordstrom, Oronoco; Daniel Frank Moertl; Thomas Rembert Sand, both of Rochester, all of Minn.

[73] Assignee: International Business Machines Corporation, Armonk, N.Y.

[21] Appl. No.: 08/951,157

[22] Filed: Oct. 15, 1997

[51] Int. Cl.[7] .................................................. G06F 13/24
[52] U.S. Cl. ........................... 710/19; 709/223; 710/15; 710/48; 710/260; 710/268; 711/2
[58] Field of Search ............................... 709/223; 710/5, 710/19, 48, 49, 126, 15, 260, 268; 711/2

[56] References Cited

U.S. PATENT DOCUMENTS

| | | | |
|---|---|---|---|
| 4,783,730 | 11/1988 | Fischer | 710/5 |
| 5,097,439 | 3/1992 | Patriquin et al. | 711/2 |
| 5,471,618 | 11/1995 | Isfeld | 710/19 |
| 5,513,368 | 4/1996 | Garcia, Jr. et al. | 710/22 |
| 5,535,341 | 7/1996 | Shah et al. | 710/126 |
| 5,535,420 | 7/1996 | Kardach et al. | 710/48 |
| 5,761,427 | 6/1998 | Shah et al. | 395/200.53 |
| 5,797,038 | 8/1998 | Crawford et al. | 710/48 |
| 5,805,929 | 9/1998 | Connolly et al. | 710/49 |

OTHER PUBLICATIONS

*Inside the AS/400*, Chapter 10, pp. 253–275, by Frank Soltis, Duke Press, Loveland, Colorado, 1996.

"PCI Local Bus Specification," Product Version, Revision 2.1, Jun. 1, 1995, pp. 1–282.

IBM Technical Disclosure Bulletin, vol. 39, No. 01, Jan. 1996, pp. 339–351, "Method for Atomic Peer–to–Peer Communication on a Peripheral Component Interconnect Bus".

*Primary Examiner*—Thomas C. Lee
*Assistant Examiner*—Chien Yuan
*Attorney, Agent, or Firm*—Birch, Stewart, Kolasch & Birch

[57] ABSTRACT

An I/O adapter connects an I/O adapter to an I/O bus and includes a device interrupt status register and an interrupt status shadow address register. The device interrupt status register stores the interrupt status of the I/O adapter. The I/O adapter accesses the interrupt status shadow address register to determine an address of main memory at which the device interrupt status register is shadowed. After shadowing the interrupt status, the I/O adapter interrupts the processor complex which may then access local, main memory to determine the interrupt status. A multifunction I/O adapter permits a plurality of I/O adapters to be connected thereto and includes a function interrupt status register to summarize the interrupt status of all the I/O adapters attached thereto. After shadowing the summarized interrupt status, the multifunction I/O adapter interrupts the processor complex which may then access local, main memory to determine the interrupt status.

17 Claims, 13 Drawing Sheets

Bridge Interrupt Status Register (BISR) — 420

FIGURE 3D

SYSTEM FOR DETERMINING ADAPTER INTERRUPT STATUS WHERE INTERRUPT IS SENT TO HOST AFTER OPERATING STATUS STORED IN REGISTER IS SHADOWED TO HOST MEMORY

CROSS REFERENCE TO RELATED APPLICATIONS

The present invention is related to U.S. patent application Ser. No. 08/950,755, entitled "Interrupt And Message Batching Apparatus and Method" and U.S. patent application Ser. No. 08/950,593, entitled, "Message Transport Mechanisms and Methods," now U.S. Pat. No. 5,983,292. These specifications are hereby incorporated by reference.

BACKGROUND OF THE INVENTION

1. Technical Field of the Invention

The field of the invention relates to messages coming into and out of a computer processor complex, referred to as I/O (input/output) messages. More particularly, this invention relates to mechanisms and techniques which interrupt the processor complex so that it can retrieve an I/O message.

2. Description of Related Art

Computer input/output (I/O) protocols govern communications between computer operating system programs and I/O adapters, such as I/O adapters that provide disk storage, communications or network capabilities. Conventionally, these I/O protocols are based upon command and response messages that are exchanged via an I/O bus interconnecting the computer central processor and memory to I/O adapters or I/O processors. An I/O processor is a type of I/O adapter that is distinguished as having more complex functions, usually in support of operating system programs. An I/O adapter will be considered the broader class of which an I/O processor is included.

In such conventional I/O protocols, operating system device driver programs create command messages which are then transmitted across an I/O bus to the I/O adapter. The adapter interprets the command and performs the requested operation. Usually, this operation includes the transfer of data between an I/O adapter connected to the I/O adapter and the computer memory across the I/O bus. Such data are typically transferred using known direct memory access mechanisms that are part of the I/O bus functions. When the I/O adapter has completed the requested operation, it creates a response message that is transmitted back to the computer memory where the operating system and device driver programs interprets that response and concludes the overall I/O operation.

Conventional PCI (Peripheral Component Interconnect) bus architectures include a host system with a central processor complex and a main memory connected to a plurality of I/O adapters via a PCI bus. In the general device model of conventional PCI buses, the conventional PCI bus architecture does not make any assumptions about the content or type of information exchanged between a host system and an I/O adapter. That is to say the PCI architecture does not define or distinguish the specific communications that occur between the host system and the I/O adapter that use the PCI bus as a transmission medium.

In the PCI specification model, an I/O adapter typically includes a set of memory locations that might collectively be called a register set or a command buffer and a response buffer. In this PCI specification model, these I/O adapters memory locations are seen by the host's central processor as additional memory locations in its own memory space, that is, host system software "maps" these PCI I/O adapter memory locations into the totality of the host system memory regions that are accessible using processor memory load and store operations. Thus, the typical host central processor performs memory store operations to PCI I/O adapter memory locations to transmit a command on the PCI bus to a common buffer and performs memory load operations from I/O adapter memory to retrieve a response of status information on the PCI bus from the I/O adapter. Unlike processor store or load operations directed to actual host system memory, the processor store or load operations to PCI I/O adapter memory locations are usually require more time and are considered very time-expensive with respect to the host central processor.

In response to the command, the I/O adapter will perform the requested operation and then generate a response message to inform the host system of the result and any errors that have occurred. This response message is typically stored in the I/O adapter's response message buffer The host system must then retrieve the response message and extract protocol information from the retrieved response message to determine the I/O adapter's response to the command. More particularly, the PCI host system reads the response message from an address in a memory of the I/O adapter to retrieve the response message. One consequence of such a conventional PCI system is that the host system processor experiences latency because it must store the command to the I/O adapter memory and then load response data from the I/O adapter memory.

Specifically, each particular vendor of an I/O adapter and each particular type of device built by a particular vendor includes specific definitions of the command buffers and response buffers. These definitions specify the semantics of the buffers, how many of them there are, their size, and at what memory addresses they are located. Because each definition is very specific not only to a particular device vendor but also to a particular device built by that vendor, there is no generalized model. One disadvantageous consequence is that the host system software must take into account the unique characteristic of each vendor and I/O adapter in order to communicate I/O commands and responses between the host system and the I/O adapter using the PCI memory read and write operations.

Furthermore, the execution of I/O commands by an I/O adapter typically requires a time duration that is many thousands, or even millions, of central processor instruction cycles. Thus, while the I/O adapter is performing a command, the device driver and computer operating system normally perform other work and are not dedicated strictly to waiting for the I/O adapter to complete the command and forward the response message. Rather, the typical device driver and operating system rely upon an asynchronous event indication, such as a processor interrupt, to signal that the I/O adapter has completed the command and that the response message is available for the operating system and device driver to interpret.

The relative timing and frequency of the signals to interrupt the processor have significant effects on the overall utilization of the central processor, utilization of the I/O adapter and its data throughput capabilities, and overall system performance. Such utilization is also affected by I/O command latency, or the duration of an I/O operation as seen by the programs that depend upon that I/O operation to complete their functions. In a large high performance processor system, the latency for an I/O memory read across a conventional PCI bus may require many, many processor cycles which seriously degrades execution speed of a program depending upon that I/O memory read. More particularly, a high performance processor attempting to do a single memory read of one word (4 bytes) of data from a PCI device may experience a latency to complete that memory read of several hundred or even several thousand processor cycles.

The PCI local bus specification utilizes a mechanism that potentially alleviates some of these inefficiencies resulting from I/O latencies. This mechanism sets target latencies which limit the time in which the master, e.g., host system, the bus arbitrator and the target, e.g., I/O adapter, must wait for responses. In practice, the PCI bus has a minimum latency based on its cycle time which is currently on the order of 33 to 66 MHz, so there are still guaranteed minimum latencies of several microseconds. Furthermore, the maximum, target latencies that the PCI standard would expect are typically on the order of many to several hundred microseconds. Potentially, for a slow I/O adapter that maximum latency could even realistically be upwards of a millisecond or even several milliseconds. The consequence to a high performance processor running with, for example, a seven nanosecond cycle time, is that, even at minimum expected latencies on a PCI bus, the processor is facing several hundred to several thousand cycles of time delay.

To optimize central processor utilization, conventional systems typically attempt to minimize the number of processor instruction cycles required to recognize the completion event and communicate this event to the I/O adapter device driver. To optimize I/O adapter throughput, conventional systems also attempt to minimize the time between the completion of one I/O command and the start of the next I/O command. To optimize overall system performance, in relation to programs that require I/O, conventional systems minimize the latency of an I/O operation, measured from the time the command is created until the time the response has been interpreted and the results are available to the program that caused or required the I/O, such as, for example, an "OPEN FILE" function that requires a disk read operation to get information about the location of the requested file.

To accomplish these objectives, conventional I/O protocols also employ both command and response queues located in the computer main memory, I/O adapter memory or registers, or a combination of both. Command queues enable the device driver to create new commands while the I/O adapter executes one such command. Response queues enable the I/O adapter to signal the completion of previous commands and proceed to new commands without waiting for the device driver or operating system to recognize and interpret the completion of these previous commands.

Similarly, computer systems generally include a processor interrupt mechanism which the I/O adapter uses to signal completion of a command and notify the processor that a response message has been placed on the response queue. The interrupt mechanism provides a signal line from the I/O adapter to the processor that, when asserted, asynchronously interrupts the central processor and switches processor execution from its current program to an operating system or device driver program designed to interpret the interrupt event. While this interrupt mechanism can help optimize the latency associated with the completion of an I/O command and interpretation of the response message, switching the processor execution from its current program to an interrupt program requires a processor context switch that requires many instruction cycles.

A context switch saves the current program's critical information such as selected processor registers and state information and loads the interrupt program's critical information. When the interrupt program completes its immediate work and is ready for the processor to resume the interrupted program, there is a second context switch to restore the critical information of the interrupted program which allows the processor to resume the interrupted program. Each context switch consumes valuable processor time. Because conventional systems interrupt the processor every time an I/O event has completed, context switches are relatively frequent and result in processor inefficiency.

Furthermore, in PCI buses on personal computers and desktop platforms, an I/O command is performed via a processor memory store which moves the command from the host system to a buffer in the I/O adapter. This I/O storing process includes the host system storing a command in a control register of the I/O adapter and loading from the host bridge hardware to complete all stores to the I/O adapter, and to verify that no errors occurred. The form of notification that an I/O command has been completed varies on the PCI adapter. A common form, however, is for the I/O adapter to raise a system interrupt line to the host system. In response to the interrupt, the host central processor performs a series of memory load operations from the PCI adapter to determine the nature of the interrupt.

Within the PCI specification model, an I/O adapter normally provides a singular PCI interconnection that encompasses or represents all of the internal elements of that I/O adapter. The singular PCI interconnection is, therefore, considered a "single function" PCI I/O adapter. The PCI specification, moreover, distinguishes a class of PCI I/O adapters as "multifunction adapters" which have a singular physical connection to a PCI bus but have two to eight independent PCI I/O adapters connected through that one common physical connection.

Each PCI bus physical connection provides a PCI "interrupt A" signal to the host system. For a PCI multifunction I/O adapter, all internally connected I/O adapter functions must share this same "interrupt A" signal to the host system. The host system then must interrogate all of the I/O adapter functions within the multifunction I/O adapter to determine which of these functions is signalling the interrupt. To enable host systems to reduce this expensive interrupt processing, the PCI specification model includes three additional PCI interrupt signals—"interrupt B", "interrupt C", and "interrupt D"—that may be implemented. These additional interrupt signals allow individual I/O adapter functions within the multifunction I/O adapter to uniquely signal an interrupt provided that no two I/O adapter functions share the same interrupt signal (A, B, C, or D). Of course, any multifunction I/O adapter that provides more than four internal I/O adapter functions must share interrupt signals between at least two I/O adapter functions resulting in a corresponding increase in host system expense to process those shared interrupt signals.

While providing four different signals provides an architectural solution to reducing host system interrupt processing expense for a multifunction I/O adapter, it is not a practical solution for many host systems. Most host system PCI buses seek to increase the physical connections and possible I/O devices to the PCI bus to insure higher utilization of the PCI bus while minimizing the cost of these connections. Additional interrupt signals increase the number of input pins required of the PCI host bridge hardware but it is a practical objective of most PCI host bridge hardware implementations to minimize the number of input/output pins. It is also impractical to provide many interrupt signals from every connection on the PCI bus. Thus, in practice many host systems limit the number of PCI bus connections which can either provide more than an "interrupt A" signal or in which all or some subset of interrupt signals (A, B, C, and D) are connected to a single "interrupt A" input to the host system. Still, multifunction I/O adapters require increased host processor expense to interrogate individual I/O adapter functions to determine the source(s) of a PCI interrupt from the physical connection.

The PCI specification model also distinguishes PCI-to-PCI bridge devices. PCI-to-PCI bridge devices create a secondary PCI bus from a primary PCI bus. Typically the primary PCI bus is the PCI bus most closely connected to the host system. The PCI-to-PCI bridge devices are connected to this primary PCI bus to provide connections for other PCI I/O adapters. To the I/O adapters connected to it, the bridge device appears as if it were the host system PCI host bridge and more specifically, the bridge device receives the I/O adapter interrupt signals from the PCI bus connections on the secondary PCI bus. Upon receiving one or more interrupt signals from the connections on its secondary bus, the PCI-to-PCI bridge signals "interrupt A" on its connection to its primary PCI bus effectively forwarding the collection of presently active second bus PCI interrupts (A, B, C, and D) to the host system via its own "interrupt A" signal. As with multifunction I/O adapters, the host system receives only "interrupt A" from the PCI-to-PCI bridge and must interrogate the bridge to determine which of the interrupt signals from the secondary bus is the source of the "interrupt A" signal. Thus, the host system experiences an increased expense to process an interrupt from an I/O adapter connected through a PCI-to-PCI bridge.

Memory load operations to retrieve data from an I/O adapter or PCI bus hardware require many central processor cycles to retrieve the data because the central processor waits for the loading operation to complete. Memory store operations which store commands from the central processor to I/O adapters and PCI bus hardware are not initially expensive in terms of central processor cycles, but the store command may not complete immediately and must either be verified via a load operation from the same PCI memory location or a series of processor load operations to verify the hardware between the central system processor and the I/O adapter. Memory store operations that require verification are commonly referred to as "verified" store operations. Memory store operations that do not require verification and that may be re-issued without adverse system effects are referred to as "non-verified" store operations. Thus, to optimize the overall system performance and minimize processor utilization, it is desirable to avoid expensive loads from I/O adapters and also expensive "verified" stores to I/O adapters.

The normal interrupt mechanism for a PCI device is to send a signal on a particular line to the central processor after having first created an interrupt status vector in an internal facility or register located within the device's memory space. The central processor, upon receiving the interrupt, determines which I/O adapter signalled the interrupt and the central processor actually looks at all of the I/O adapters that could have potentially signalled such an interrupt. Sometimes, however, the central processor knows from the PCI bus connection topology that the interrupt came from a particular I/O adapter and so it looks only at that I/O adapter. In response to such an interrupt, the central processor loads from the memory address in the device specific to that vendor and device type to extract the interrupt status vector that describes the particular reason for which the device raised the interrupt.

If there are multiple I/O adapters sharing a common interrupt line, the conventional host system must read each I/O adapter's interrupt status register in each I/O adapter's memory to determine which I/O adapter presented the interrupt. The result is a rather lengthy process in which the system loads from each I/O adapter to see which one interrupted the system. Because each load form a PCI device is expensive, if there are a large number of I/O adapters connected to a single interrupt line, the result is a large number of memory loads to determine which I/O adapter interrupted and the cause of the interrupt. This interrogation reduces host central processor utilization and overall host system performance.

SUMMARY OF THE INVENTION

An object of the invention is to provide efficient determination of which of a plurality of I/O adapters sharing a common interrupt line actually presented the interrupt signal and thereby avoid multiple loads from I/O adapters. Another object of the invention is to efficiently determine the interrupt status of the interrupting I/O adapter particularly by reducing or eliminating host processor memory loads from the PCI I/O adapter. Still another object of the invention is to improve the interrupt sequence to increase system efficiency.

To achieve the above objects, the present invention discloses expands and improves upon conventional command and response queues by having the central processor utilize local, main memory to access and service the queues by distributing the I/O bus traversal burden to the I/O adapter (s).

To further achieve the above objects, the invention discloses an interrupt shadowing mechanism and method which copies the interrupt status from the I/O adapters to system main memory before presenting an interrupt. Thus, the system may locally access the shadowed interrupt vector upon interrupt and does not need to traverse the I/O bus to determine interrupt status.

To still further achieve the above objects, the invention discloses an I/O adapter adapting an I/O device to an I/O system having a processor complex including a processing unit, main memory connected to the processing unit, and a bus interconnecting the processor complex and the I/O adapter; the I/O adapter comprising: a device interrupt status register storing an interrupt status of the I/O adapter, an interrupt status shadow address register storing an address in the main memory at which the interrupt status stored in the device interrupt status register is shadowed, interrupt decision logic sending an interrupt signal to the processor complex after the device interrupt status register is shadowed to the interrupt status shadow address in the main memory.

To further achieve the objects of the invention, a hierarchically organized interrupt status determining and signalling structure is disclosed for an I/O system having a host system, an I/O bus, a multi-function I/O adapter connected to the I/O bus, and a plurality of I/O adapters connected to the multi-function I/O adapter, including: a device interrupt status register for each of the plurality of I/O adapters recording an interrupt status of a corresponding I/O adapter, a function interrupt summary register summarizing the interrupt status of each device interrupt status register to summarize the interrupt status of each I/O adapter connected to the multi-function I/O adapter, an interrupt status shadow address in a memory of the host system storing a shadowed copy of the function interrupt summary register, and interrupt decision logic sending an interrupt signal interrupting the processor complex after the function interrupt summary register is shadowed to the interrupt status shadow address in the host system memory.

To even further achieve the above objects, the invention discloses an I/O system, comprising: a processor complex including a processing unit capable of switching context between an I/O adapter handling state and an application program handling state, main memory connected to the processing unit the main memory including an interrupt status shadow address storing a shadowed copy of an interrupt status from an I/O adapter device, a bus interconnecting the processor complex and the I/O adapter; the I/O adapter having an I/O device attached thereto, the I/O adapter including a device interrupt status register storing an interrupt status of the I/O device or an I/O adapter connected to the I/O adapter, the device interrupt status register being shadowed to the interrupt status shadow address in the main memory, and interrupt decision logic sending an interrupt signal to the processor complex after the device interrupt status register is shadowed to the interrupt status shadow address in the main memory, the processor complex receiving the interrupt signal, switching context switch from the application handling state to the I/O handling state, and then accessing the interrupt status shadow address to determine the interrupt status.

To still further achieve the above objects, the invention discloses a method of adapting an I/O device to an I/O system having a processor complex including a processing unit, main memory connected to the processing unit, and a bus interconnecting the processor complex and I/O adapter to which the I/O device is connected; the I/O adapting method comprising the steps of: storing an interrupt status of the I/O adapter in the I/O adapter, shadowing the interrupt status stored in the storing step to an interrupt status shadow address of the main memory, and sending an interrupt signal to the processor complex after the shadowing step is completed.

To even further achieve the above objects, the invention discloses a hierarchically organized interrupt status determining and signalling method for an I/O system having a host system, an I/O bus, a multifunction I/O adapter connected to the I/O bus, and a plurality of I/O adapter functions connected to the multifunction I/O adapter, comprising: storing an interrupt status of each I/O adapter function to the multifunction I/O adapter in corresponding device interrupt status registers; summarizing the interrupt status of each device interrupt status register to summarize the interrupt status of each I/O adapter function connected to the multifunction I/O adapter; shadowing the summarized interrupt status summarized in the summarizing step to an function interrupt status shadow address of the main memory; and sending an interrupt signal to the processor complex after the shadowing step is completed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIGS. 3(a)–(d) illustrate MTM interrupt registers which may be located in the I/O adapter shown in FIGS. 1–2.

DETAILED DESCRIPTION OF PREFERRED EMBODIMENT

Figure 1:
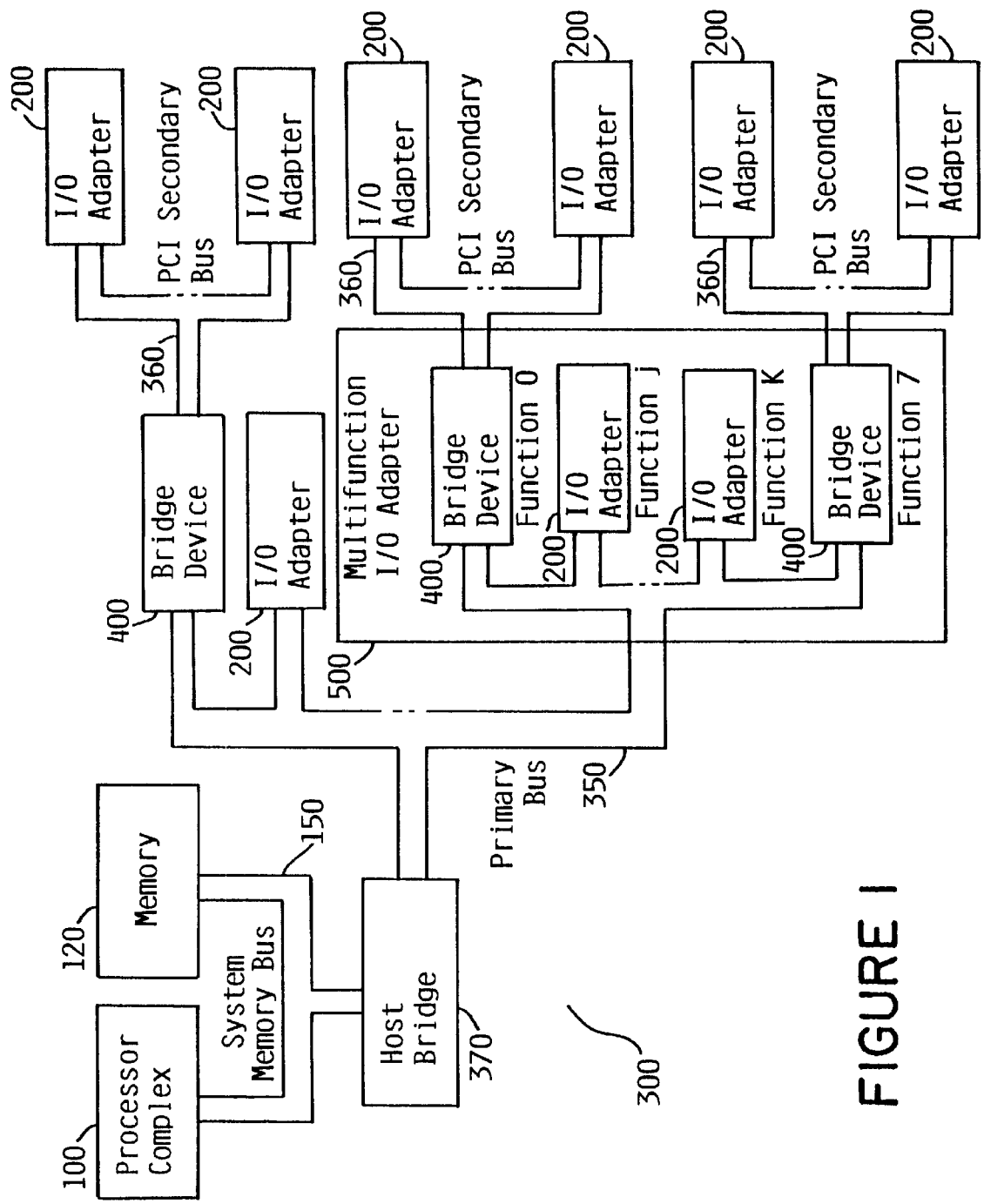
FIG. 1 is high-level block diagram illustrating an I/O interconnection topology according to the teachings of the present invention.

FIG. 1 illustrates the components and an interconnection topology for a computer system utilizing the present invention. A processor complex 100 and memory 120 are connected to system memory bus 150. Host bridge 370 interconnects the system memory bus 150 with a primary bus 350. Various components are connected to the primary bus 350 including, for example, I/O adapter 200, bridge device 400 and a multifunction I/O processor or a PCI multifunction adapter 500. The bridge device 400 bridges the primary bus 350 and a secondary bus 360 to which various I/O adapters 290 may be connected. The host bridge 370 and primary bus 350 are collectively referred to as an I/O bus 300. The I/O adapters 200 encompass a wide variety of I/O adapters including tape drives, optical drives, T-Ring, ethernet, FDDI, ATM, wireless relays, twinax, LAN connections, WAN connections, etc.

Figure 2A:
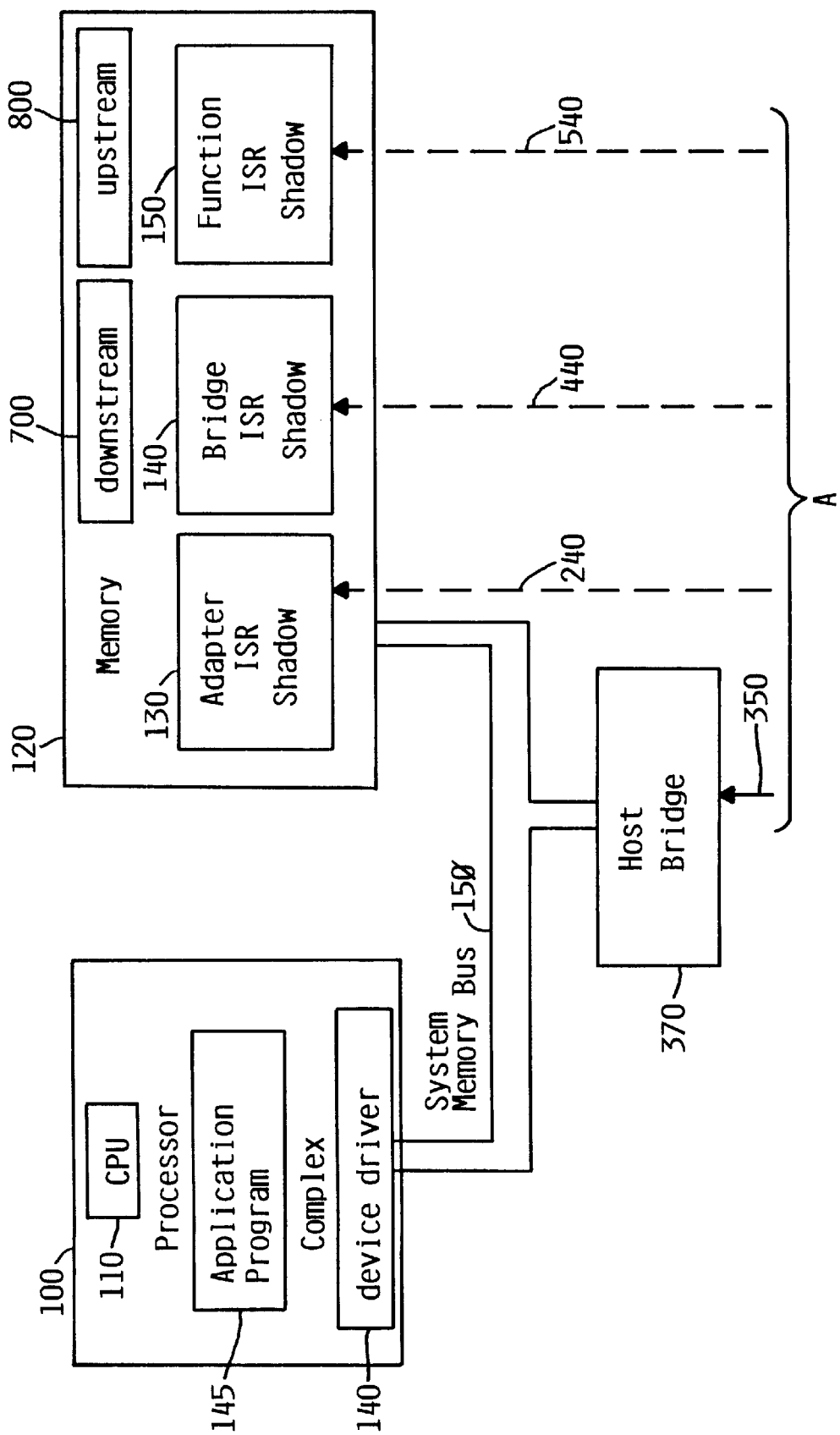
FIG. 2 is a high-level block diagram illustrating details of the interconnection topology including various registers and interrupt lines according to the teachings of the present invention.
Figure 2B:
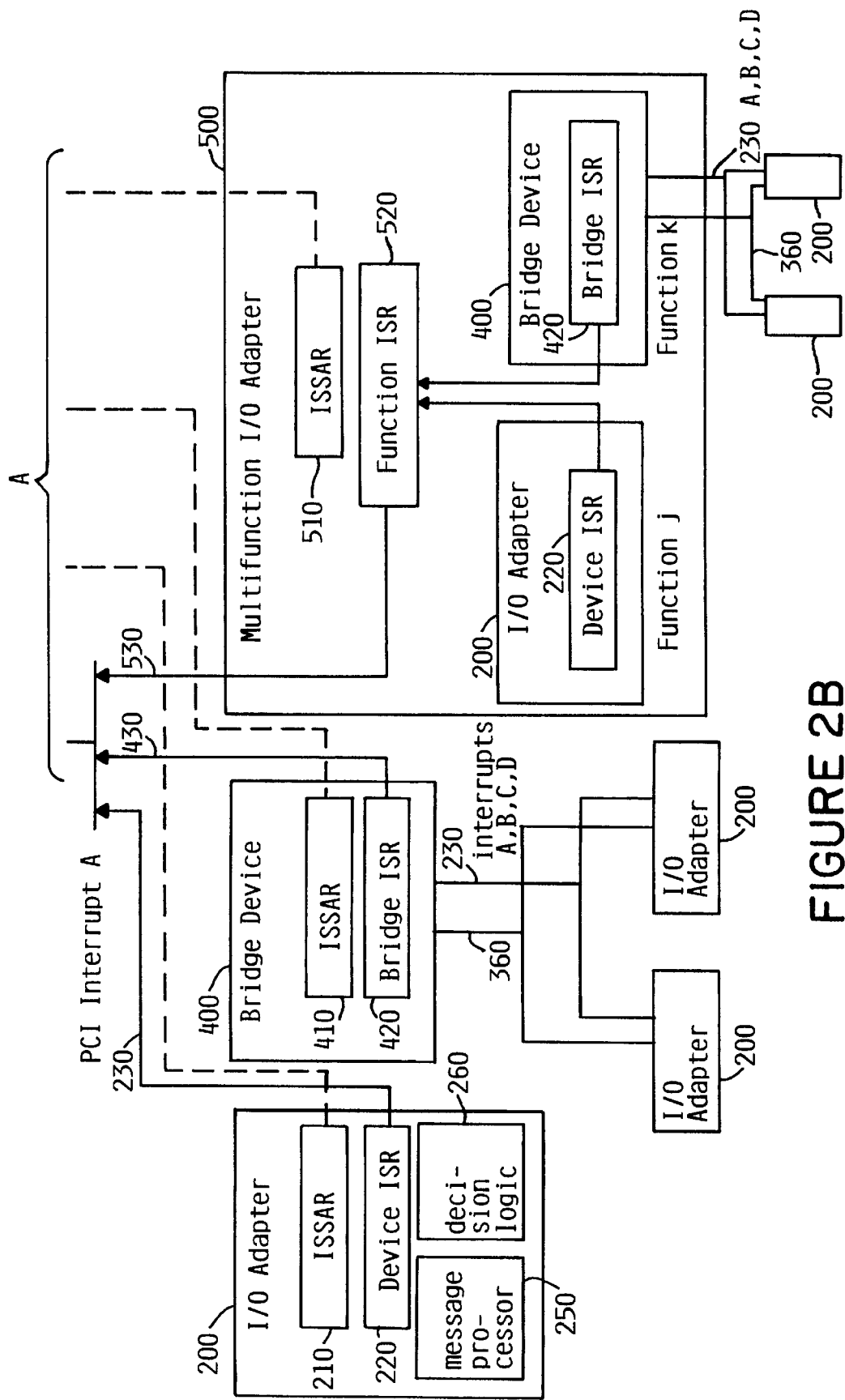

FIG. 2 shows more detail and function of the I/O adapters 200, bridge device 400, processor complex 100 and memory 120 including the locations of particular registers. The processor complex 100 includes a central processing unit (CPU) 110. Although only one CPU 110 is illustrated, it is to be understood that a multiple processors may be included within CPU 110. Furthermore, the memory 120 may be physically included within the processor complex 100 or connected to host system bus 150 as shown in FIG. 2. During I/O processing, the central processing unit 110 executes a device driver 140 program or function that permits the processor complex 100 to communicate with the I/O adapter 200, bridge device 400 and multifunction I/O adapter 500. When not processing I/O, the central processing unit 110 executes, for example, an application program 145. A conventional context switch procedure may be used to switch the context of the CPU 110 between the device driver 140 and the application program 145.

Each bridge device 400 provides a bridge between the primary bus 350 and the secondary bus 360. The multifunction adapter 500 is another subset of I/O adapters which permit multiple I/O adapters 200 and/or bridge devices 400 to be connected to other I/O adapters 200 through a secondary bus 360. Bridge device 400 includes a bridge interrupt status register 420.

In a preferred implementation, the primary bus 350, secondary bus 360, and I/O adapters 200 conform to the conventional PCI bus specification. Also, the host bridge 370 in the preferred implementation is a PCI host bridge that bridges between and provides compatibility between the host system bus 150 and a PCI primary bus 350. A wireless bus implementation may also be included as part of the invention herein. The interrupt signals 230, 430, 530 from I/O adapter 200, bridge device 400 and multifunction adapter 500, respectively represents a subset of the I/O bus 350 and may be implemented with one or more of the conventional PCI Local Bus Interrupt (A, B, C, or D) signals.

The memory 120 of the processor complex 100 further includes a downstream queue structure 700 storing downstream messages such as command messages from the processor complex 100 to the I/O adapter 200. Memory 120 also stores an upstream queue structure 800 storing upstream messages such as a response message to the processor complex 100. The terms "upstream" and "downstream" are relative terms taken from the processor complex 100 point of view. As an alternative, it is to be understood that the point of view may be changed in an equivalent manner. For example, the roles of the processor complex 100 and I/O adapter 200 could be reversed such that the I/O adapter 200 is considered "upstream" with respect to the processor complex 100.

Apart from and in addition to conventional I/O adapter and related control components such as direct memory access components, the I/O adapter 200 includes a message processor 250 in communication with decision logic 260. The I/O adapter 200 is also provided with extended function interrupt registers which include an interrupt status shadow address register (ISSAR) 210 and a device interrupt status register (DISR) 220, both of which may be used separately or in combination with message transport mechanism registers as explained in more detail in U.S. patent application Ser. No. R0997-064 and U.S. patent application Ser. No. R0997-125. Both the message transport mechanism registers and the extended function interrupt registers are connected to the message processor 250 and decision logic 260. The message processor 250 processes incoming downstream messages from the processor complex 100. Message processor 250 also generates response messages and transmits response messages to the upstream queue 800. Decision logic 260 decides when to interrupt the processor complex 100 that work is pending on the upstream queue 800 by sending an interrupt signal 230.

Figure 3A:
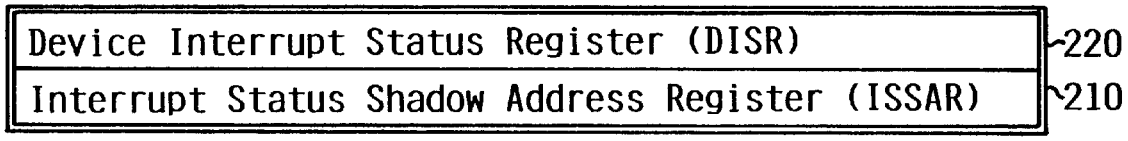

The extended function interrupt registers, generally shown in FIG. 2, are more specifically shown in FIGS. 3(a)–(d). FIG. 3(a) illustrates the extended function interrupt registers when the I/O adapter 200 is a singular I/O adapter function. The extended function registers comprise a device interrupt status register 220 and an interrupt status shadow address register 210. The device interrupt status register 220 stores the interrupt status of the I/O adapter 200 including message queue interrupts and I/O adapter status.

The interrupt status shadow address register 210 stores an address (interrupt status shadow address) of the processor complex memory 120 at which the interrupt status of the I/O adapter 200 is copied (shadowed) by the I/O adapter 200. In other words, the I/O adapter 200 accesses the ISSAR to determine which location of the memory 120 to store a copy of the interrupt status contained in the device ISR 220.

Figure 3B:
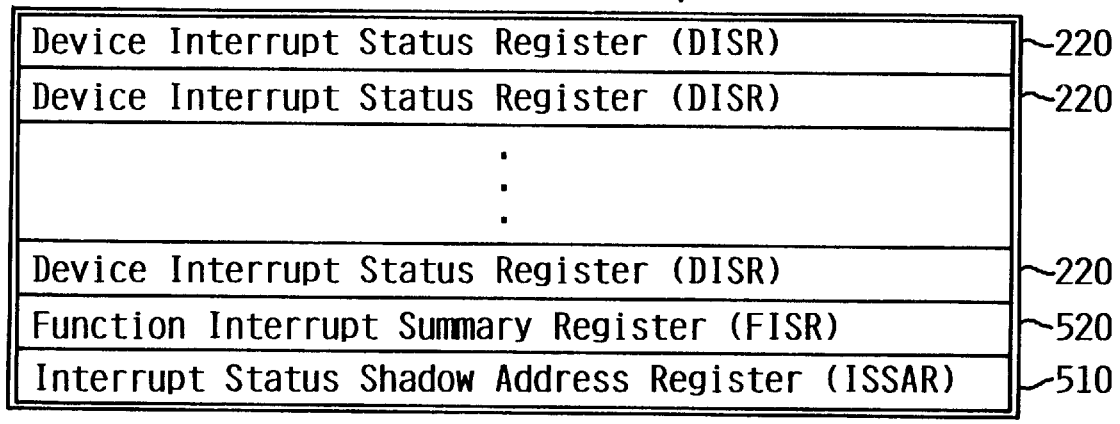

FIG. 3(b) shows the extended function interrupt registers for a multifunction device 500 permitting multiple I/O adapters 200 and/or bridges 400 to be connected thereto. The extended function interrupt registers further comprise a function interrupt summary register (FISR) 520, an interrupt status shadow address register 510, and for each I/O adapter 200 attached to the multifunction I/O adapter 500, a device interrupt status register 220.

Figure 3C:
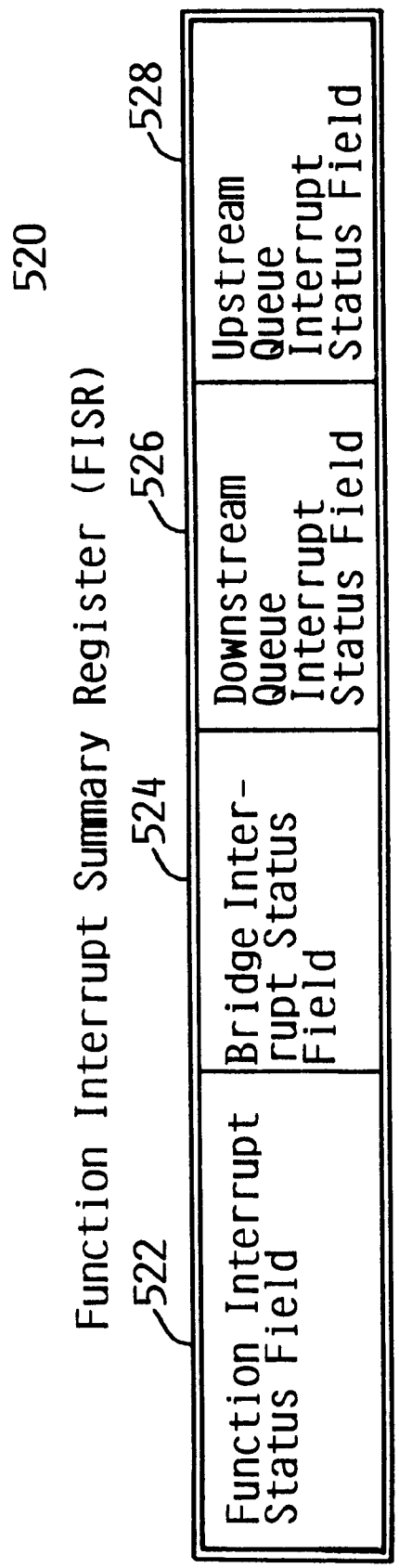

As shown in FIG. 3(c), the function interrupt summary register 520 preferably includes four fields. The first field is a function interrupt status field 522 having a number of bits equal to the number of I/O adapters 200 connectable to the multifunction I/O adapter 500. A corresponding one of these bits is set when a connected I/O adapter 200 signals an interrupt in its device interrupt status register 220, i.e., the function interrupt status field 522 summarizes which of the I/O adapters 200 connected to the multifunction I/O adapter 500 is signalling an interrupt. The second function interrupt summary register field is a bridge interrupt status field 524 having a number of bits equal to the number of bridge devices 400 connectable to the multifunction I/O adapter 500. Likewise a corresponding one of these bits is set when a connected bridge device 400 signals an interrupt in its bridge interrupt status register 420. The third function interrupt summary register field is a downstream queue interrupt status field 526 having a number of bits equal to the number of non-bridge I/O adapters connectable to a multifunction I/O adapter 500 that support downstream message transport mechanism queuing. Setting a bit in the downstream queue interrupt status field corresponding to a connected I/O adapter 200 sets a downstream queue status bit in its device interrupt status register 220. In other words, the downstream queue interrupt status field 526 summarizes which of the I/O adapters 200 connected to the multifunction I/O adapter 500 has signalled a downstream queue interrupt condition in its device interrupt status register 220. The fourth function interrupt summary register field is an upstream queue interrupt status field 528 having a number of bits equal to the number of non-bridge I/O adapters connectable to a multifunction I/O adapter 500 that support message transport mechanism queuing. Similarly, setting a bit corresponding to one of these connected I/O adapters 200 sets an upstream queue status bit in its device interrupt status register 220, i.e., the upstream queue interrupt status field summarizes which of the I/O adapters 200 connected to the multifunction I/O adapter 500 has signalled an upstream queue interrupt condition in its device interrupt status register 220.

The invention may also include conventional masking registers (not shown) as known in the art to mask interrupts in the device interrupt status register 220 and/or function interrupt summary register 520. To clear such a masking register, the invention may further include conventional clear masking registers to clear bit(s) set in the masking register.

Each bridge device such as bridge device 400 within a multifunction I/O adapter 500, a stand-alone bridge device 400 and a host bridge 370 includes a bridge interrupt status register 420 which essentially provides a synchronizing interrupt summary for all devices attached thereto. Each interrupt signal line 230, such as interrupts A–D in the PCI bus specification, has a corresponding bit location in the bridge interrupt status register 420 which is set when the corresponding interrupt signal is raised by one of the I/O adapters 200 attached to the bridge device 400.

If a plurality of I/O adapters 200, multi-function I/O adapters 500 and/or bridge devices 400 are connected to the I/O bus 350, then the interrupt status shadow address space must be enlarged to include a plurality of corresponding interrupt status shadow addresses pertaining to each connection on the I/O bus 350. In other words, the memory 120 includes a unique memory location (ISSA) for each connection on the I/O bus 350. In this way, the CPU 110 can perform a local memory access to memory 120 to determine the interrupt status for each device connected to the I/O bus 350. More particularly, if a plurality of devices such as I/O adapters 200, multifunction I/O adapters 500 and/or bridge devices 400 are connected to the I/O bus 350, then each of these devices individually shadows its interrupt status vector to a separate ISSA by utilizing the interrupt status shadow address register 210 in each device to determine the location in memory 120 which contains the ISSA associated with that device.

Interrupt Handling

Interrupt handling can be separated into interrupt handling for single-function I/O adapters 200 and interrupt handling for multifunction I/O adapters 500. Before presenting a detailed implementation of interrupt handling, a general description of the ideas and concepts of the inventive interrupt handling mechanisms and methods will be presented.

Shadowed Interrupt Propagation

Rather than having each I/O adapter 200 retain a interrupt status within its own memory or own register which forces the processor complex to retrieve the interrupt status as in the prior art, the inventive I/O adapter 200 instead "shadows" or copies interrupt status from the DISR 220 into a system main store 120 location before presenting an interrupt 230 to the processor complex 100. During initialization, the I/O adapter 200 is instructed that there is an adapter ISR shadow 130 in system main storage 120 at which the I/O adapter 200 can copy its device interrupt status register 220. The address of the adapter ISR shadow 130 is stored in the interrupt status shadow address register 210.

After shadowing interrupt status, the I/O adapter 200 signals to the system 100 that one or more messages are pending in the upstream queue 800 by sending an interrupt signal 230. When the processor complex 100 receives the interrupt signal 230, then it reads the interrupt status shadow from the adapter ISR shadow 130 in memory 120. In other words, the processor complex 100 interrogates the shadowed interrupt status to determine the type of interrupt received.

The inventive interrupt sequence for an I/O adapter 200 is generally as follows: the I/O adapter 200 first loads its device interrupt status register 220 with the current interrupt status, writes a copy of the device interrupt status register 220 via direct memory access to system main storage 120, then completes the interrupt sequence by presenting an interrupt signal 230 to the processor complex 100. The processor complex 100, knowing that the I/O adapter 200 has the inventive facilities and functionalities, then only looks at the adapter ISR shadow 130 in its system main store 120. This avoids the expensive load from the I/O adapter memory space 220, 420, and 520 which, as we described above, may take many, many thousands of processor cycles to complete. Utilizing the invention interrupt shadowing process permits a very fast path on the order of the normal cycle time of the processor for the processor complex 100 to determine the interrupt status of the various I/O adapters 200. In other words, the invention distributes the interrupt status workload to the various I/O adapters 200 by forcing them to notify the processor complex 100 of their individual status using a shadowing process in which their device interrupt status register(s) 220 are copied to system main store 120. Forcing the individual devices 200 to distribute that workload frees up the processor complex 100 from polling each device 200 to find out the source of and reason for the interruption.

Single-Function Interrupts

Figure 4:
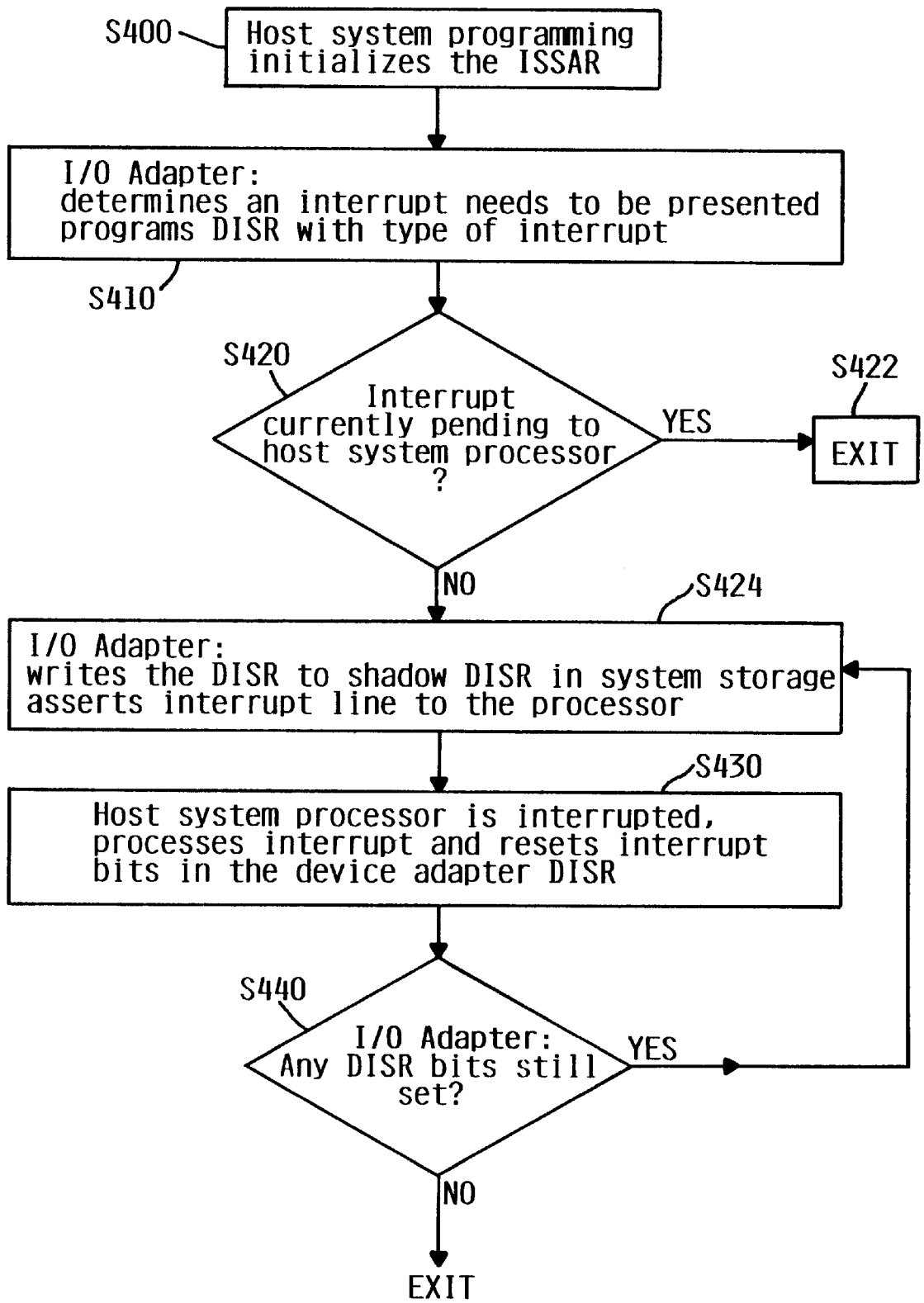
FIG. 4 is a high-level flow chart illustrating an example of single-function device interrupt flow according to the invention that may be implemented by the inventive I/O system shown in FIGS. 1–2.

FIG. 4 shows single-function device interrupt operation utilized when an I/O adapter 290 is connected to a single-function I/O adapter 200. During the initialization step S400, the processor complex 100 writes the address of the adapter ISR shadow 130 into the interrupt status shadow address register 210.

The single function interrupt sequence begins when the I/O adapter 200 determines that an interrupt needs to be presented to the processor complex 100 in step S410. Then the device interrupt status register 220 is programmed with the type of interrupt in step S410 by, for example, setting appropriate bit(s) in the device interrupt status register 220. The I/O adapter 200 then determines if an interrupt is already currently pending in step S420. If yes, then the interrupt sequence ends as indicated by exit step S422. If no interrupt is currently pending, then, in step S424, the I/O adapter 200 copies the interrupt vector from the device interrupt status register 220 to the adapter ISR shadow 130 in memory 120 and the I/O adapter 200 asserts an interrupt line 230 to interrupt the processor 110.

After processing the interrupt, the processor complex 100 resets the pending interrupt bit(s) in the device interrupt status register 220 as indicated by step S430. The I/O adapter 200 then determines if any other bits in the device interrupt status register are still set in step S440. If more interrupts are pending, the process begins again by looping back to step S424 where the I/O adapter 200 shadows the updated device interrupt status register 220 to the adapter ISR shadow 130 in memory 120. If no additional interrupts are pending, this routine is exited.

Multifunction Interrupts

Figure 5:
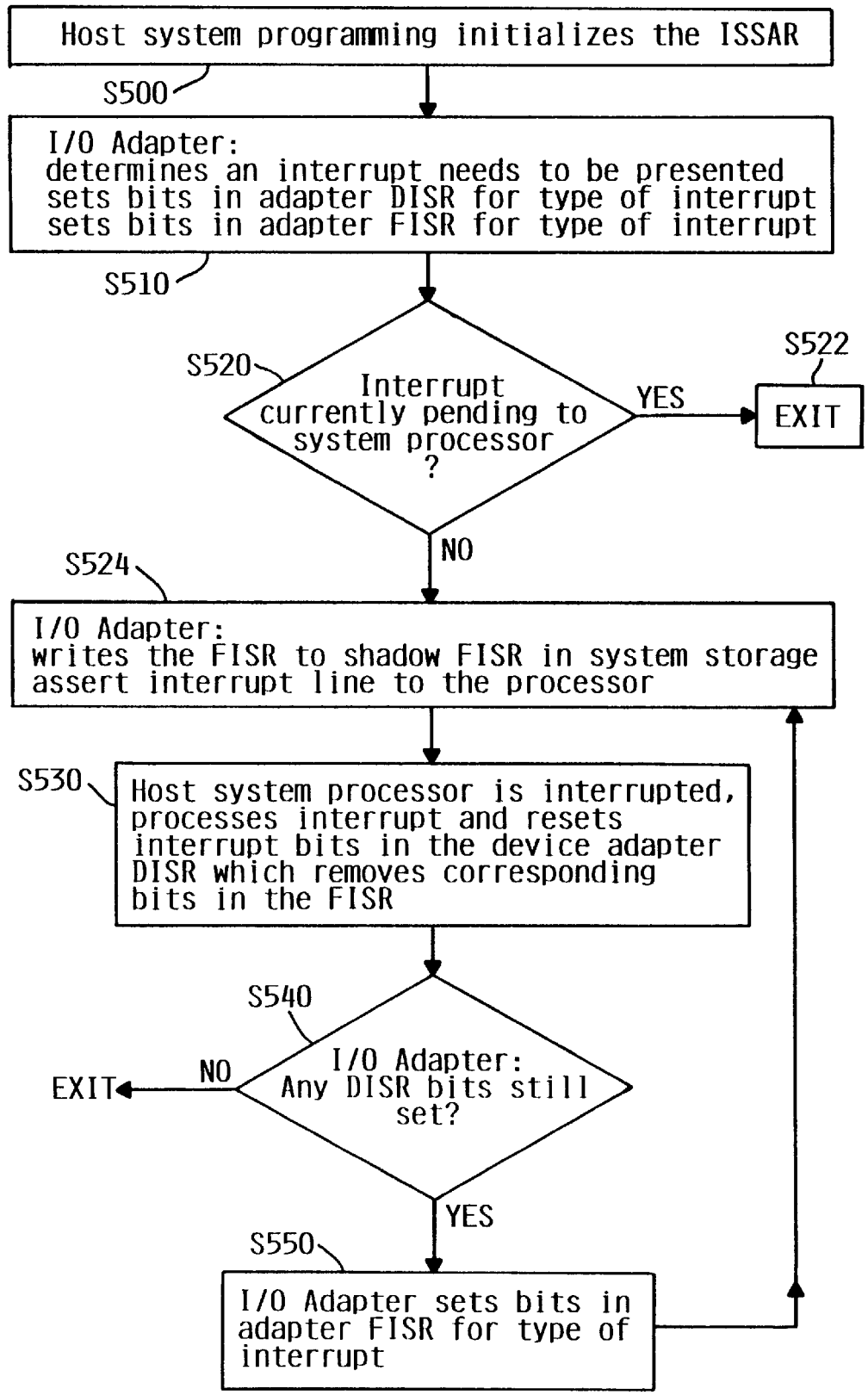
FIG. 5 is a high-level flow chart illustrating an example of multi-function device interrupt flow according to the invention that may be implemented by the inventive I/O system shown in FIGS. 1–2.
Figure 6A:
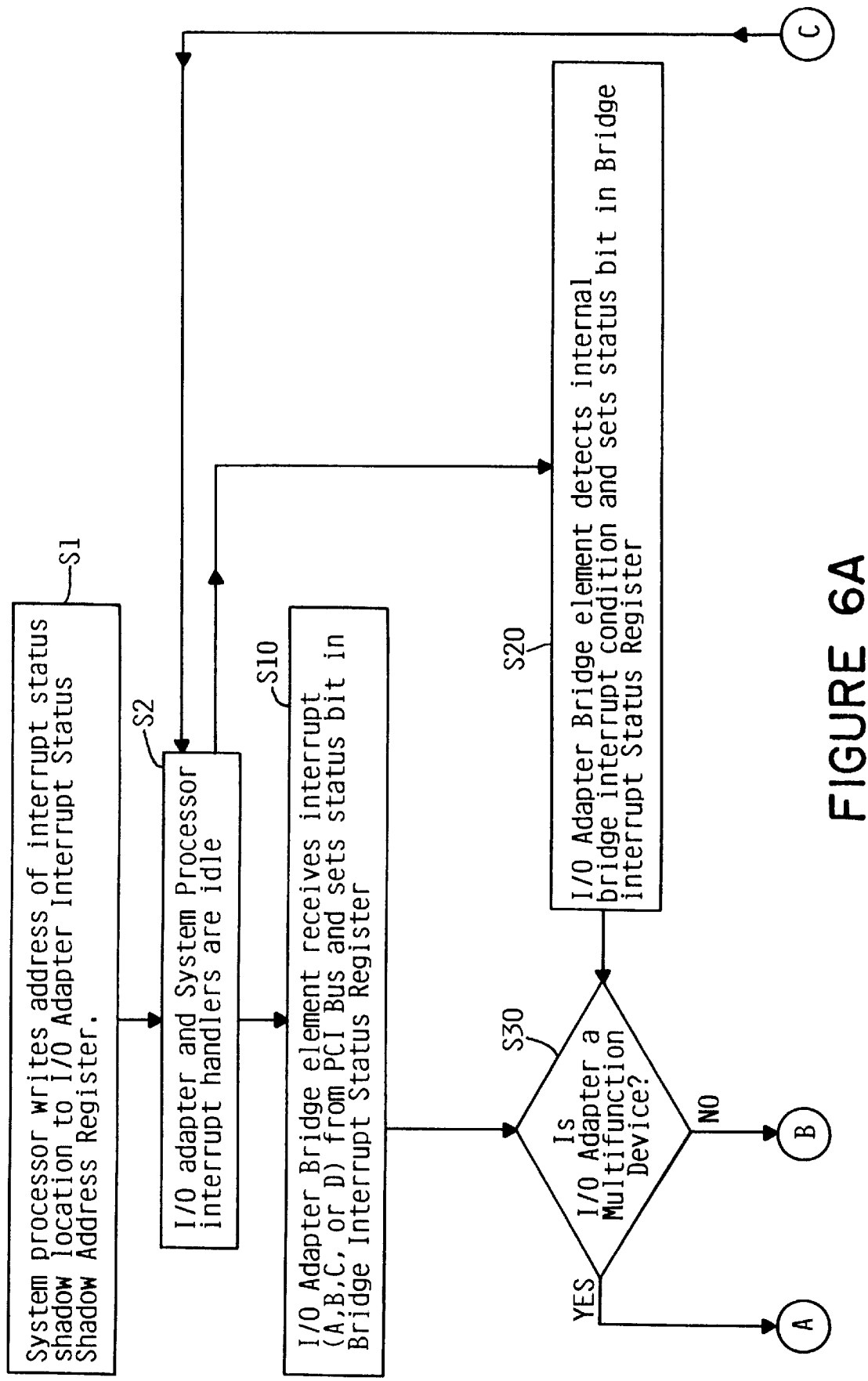
FIG. 6 is a high-level flow chart illustrating an example of bridge device interrupt flow according to the invention that may be implemented by the inventive I/O system shown in FIGS. 1–2.
Figure 6B:
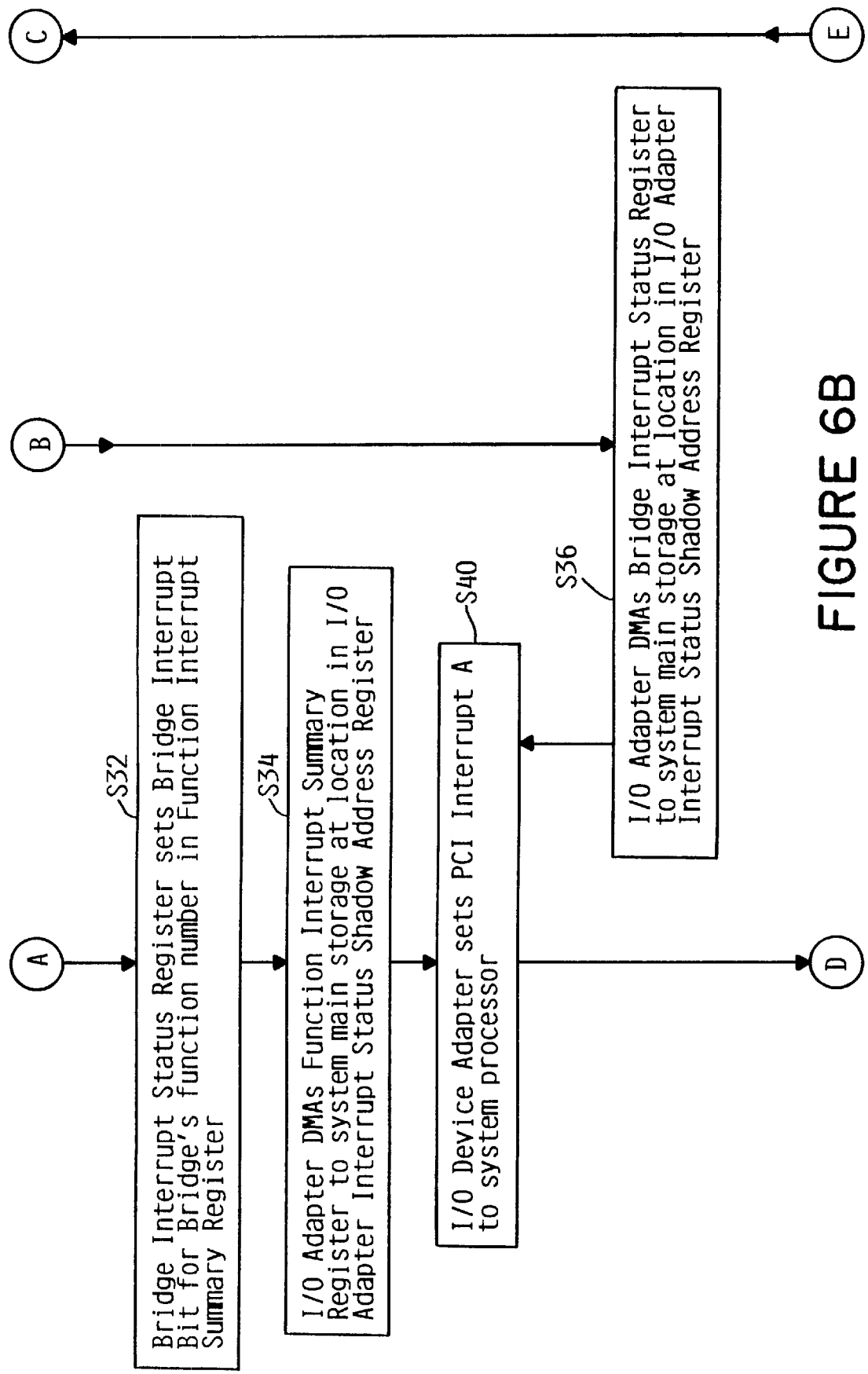
Figure 6C:
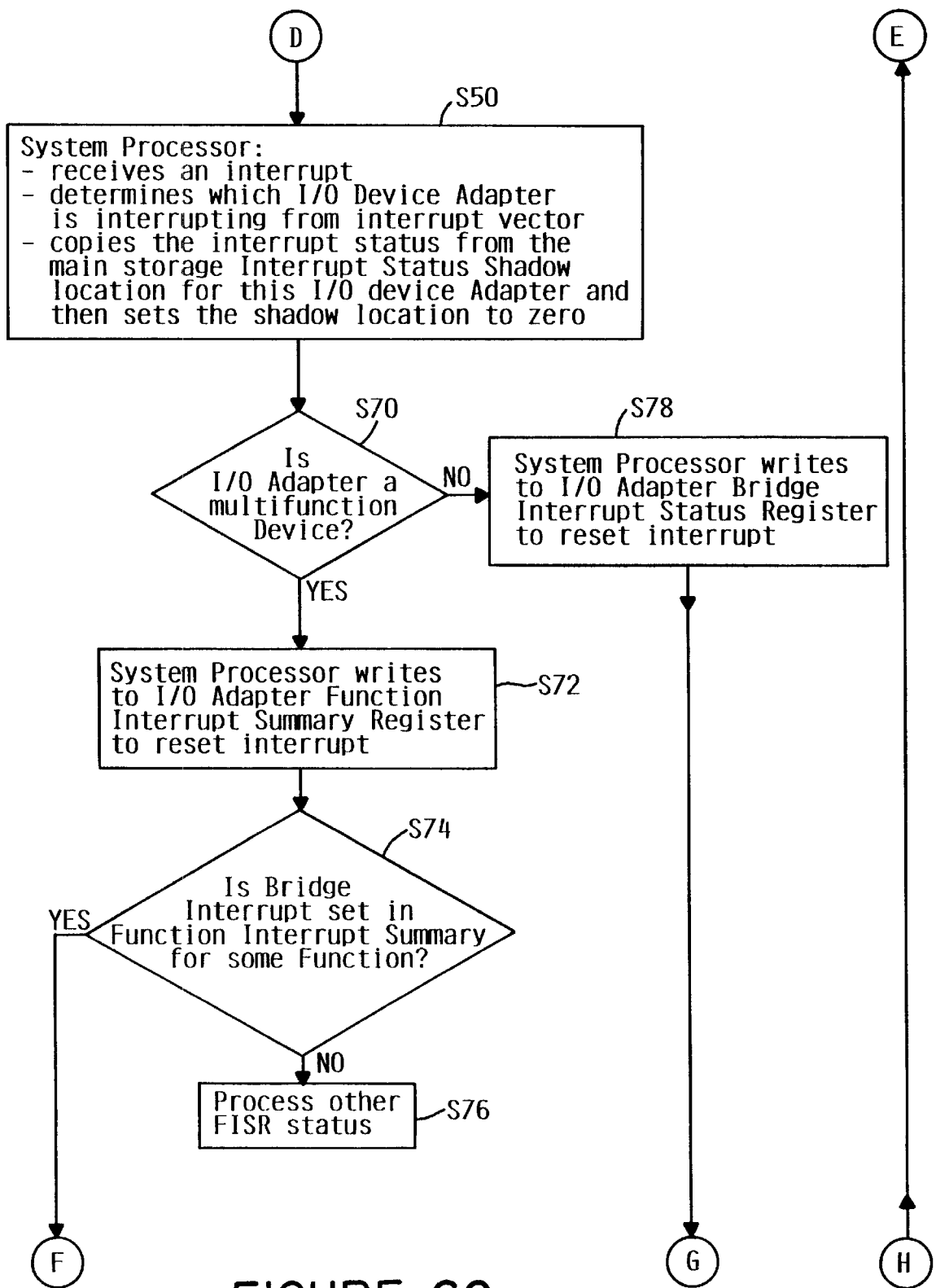
Figure 6D:
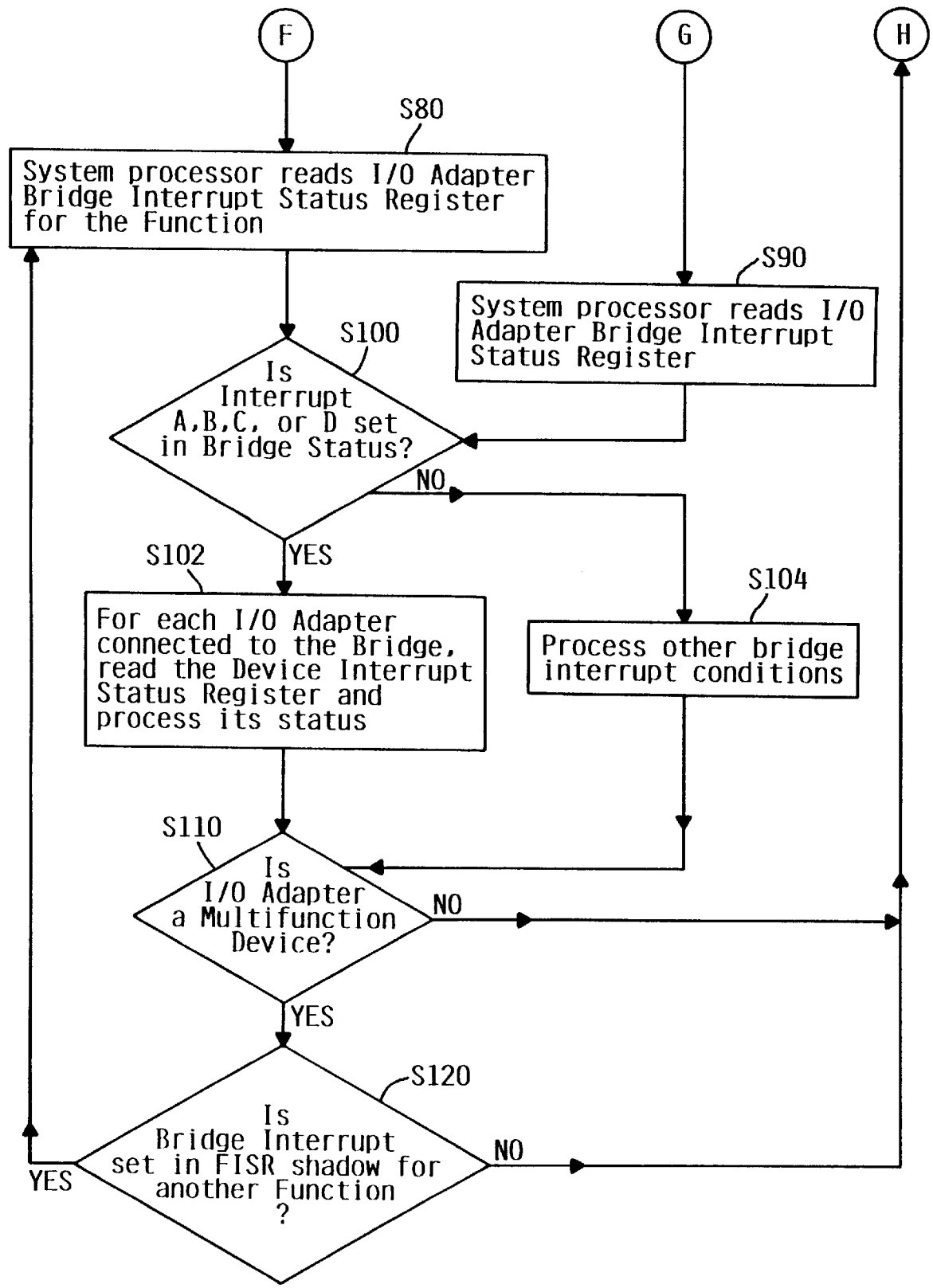

FIG. 5 is a flow chart of the device interrupt operation that is utilized when multiple I/O adapters 200 are connected to a multifunction I/O adapter 500. During the initialization step S500, the processor complex 100 writes the address at which the function interrupt summary register 520 is shadowed by the I/O adapter 200 into the interrupt status shadow address memory location 160. The multifunction interrupt sequence begins when the I/O adapter 200 determines that an interrupt needs to be presented to the system 100 in step S510. The device interrupt status register 220 and the function interrupt summary register 520 are programmed with the type of interrupt in step S510 by, for example, setting appropriate bit(s) in these registers and more specifically in the function interrupt status field 522 of the function interrupt summary register 520 corresponding to the I/O adapter 200 and associated device interrupt status register 220 requesting the interrupt.

After the function interrupt summary register 520 is programmed, the I/O adapter 200 determines if an interrupt is already currently pending in step S520. If yes, then the interrupt sequence ends as indicated by exit step S522. Otherwise the function interrupt summary register 520 is updated to an appropriate address in the function ISR shadow address 150 in memory 120 in step S524 and the I/O adapter 200 asserts an interrupt 530 to the processor complex 100.

After processing the interrupt, the processor complex 100 resets the pending interrupt bit(s) in the device interrupt status register 220 in the I/O adapter 200 as indicated by step S530 which also removes or resets corresponding interrupt bits in the function interrupt status field 522 of the function interrupt summary register 520. The I/O adapter 200 then determines if any other device interrupt status register bits are set in step S540. If more interrupts are pending, the I/O adapter 200 updates the corresponding bits in the function interrupt summary register 520 as indicated by step S550 and the process begins again by looping back to step S524 where the I/O adapter 200 updates the shadowed function interrupt summary register 150 in memory 120. If no additional interrupts are pending this routine is exited. If the device interrupt status register has already been programmed with an interrupt type, the current interrupt may be handled with the previous interrupt or be handled after the processor complex 100 is given a new copy of the function interrupt summary register 520.

Interrupt Propagation Over A Bridge Device

An I/O adapter 200 may also be connected to a secondary bus 360 through a bridge device 400 such as a PCI/PCI bridge connected to the primary bus 350 as illustrated in FIGS. 1 and 2. In this case, the interrupt status must be stored and forwarded first to the bridge device 400 that separates the secondary bus 360 from the primary bus 350 and then forwarded to system main storage 120 across the primary bus 350. The host bridge 370 connects the system memory 120 to the I/O primary bus 350, but in most respects it is largely transparent to the message or to interrupt propagation. The host bridge 370 participates because it is in the path between the I/O primary bus 350 and the system memory 120, but from the I/O adapter 200 and system 100 point of view, the host bridge 370 is largely transparent unless there are failures in that path.

Continuing the description of interrupt propagation from a I/O adapter 200 on a secondary bus 360, the I/O adapter 200 presents the interrupt status shadow address on the secondary bus 360 and writes, using a direct memory access, the requested data to the device interrupt shadow register in memory 120. Thus, the interrupt data propagates from the device interrupt status register 220 to the bridge 400 to the primary bus 350 and through the PCI host bridge 370 into the system memory 120 and is thereby shadowed in the interrupt status shadow location 130 pointed to by the interrupt status shadow address register 210. At that point, the interrupt 230 itself has not yet propagated to the bridge 400. Instead, only the device interrupt status 220 has been shadowed into the main store independent whether it originated from an I/O adapter connected to a secondary or primary bus 360, 350. From a processor complex 100 point of view, the device interrupt status 220 is in system main store 120 before an interrupt occurs.

With a bridge 400, the interrupt emanates from the I/O adapter 200 to the bridge 400 so the interrupt line 230 now goes to the bridge 400 and is then forwarded to the processor complex 100 via interrupt line 430. In so doing, the bridge 400 actually presents the interrupt on line 430, and the processor complex 100 must determine that this is a bridge interrupt. The processor complex 100 must then identify for what purpose the bridge is interrupting and having done that recognize that the interrupt is for an I/O adapter 200 below the bridge 400. This role is played by the bridge interrupt status register 420. More particularly, bridge 400 includes a bridge interrupt status register 420 and an interrupt status shadow address register 410. The I/O adapter 200 on the secondary bus 360 would have also an interrupt status shadow address register 210. So in effect, both the bridge and the device perform a shadowing operation. The I/O adapter 200 stores its interrupt shadow register 210 and then interrupts the bridge 400. The bridge 400 stores its interrupt status registers 410, 420 and then interrupts the host system.

To process a pure bridge environment interrupt, the processor complex 100 first looks at the bridge interrupt shadow status register 140 in memory 120 and determines that the bridge 400 is signalling an interrupt on behalf of a I/O adapter 200 below the bridge 400. Then the processor complex 100 looks at the device's ISR shadow 130 to determine the interrupt status. Both the bridge 400 and the I/O adapter 200 have independent shadow address registers 210, 410. In the process of forwarding the interrupt on behalf of the device to the system, the bridge 400 must also shadow its interrupt register 420 to the system.

FIG. 6 is a flow chart of the bridge interrupt operation that is utilized when I/O adapter(s) 200 are connected to a stand-alone bridge 400 or a bridge 400 within a multifunction I/O adapter 500. The bridge interrupt operation flow chart of FIG. 6 begins with step S1. In step S1, the processor complex writes the address of the adapter interrupt status register shadow 130 to the I/O adapter's interrupt status shadow address register 210. Step S2 is idle state for the I/O adapter 200 and the processor complex 100. When the processor complex receives an interrupt 230, 430, 530, then either step S10 or S20 is executed. In step S50, the I/O bridge device 400 receives an interrupt from an attached I/O adapter 290 and sets a corresponding status bit in the bridge interrupt status register 420. On the other hand, in step S20, the I/O bridge device 400 detects an internal bridge interrupt condition and sets a corresponding status bit in the bridge interrupt status register 420.

Step S30 follows both steps S10 and S20. Step S30 is a decision step which determines whether the I/O adapter is a multifunction I/O adapter 500 or a single function I/O adapter 200. If the device adapter is a multifunction adapter 500, then step S32 is executed which causes the bridge interrupt status register 420 to set a bridge interrupt bit for the bridge's function number in the function interrupt summary register 520. Then, step S34 causes the multifunction I/O adapter 500 to write, via direct memory access, the function interrupt summary register 520 to the system main storage 120 at the memory address location 160 specified by the interrupt status shadow address register 510. Then step S40 causes the multifunction I/O adapter 500 to send interrupt 530 to the processor complex 100.

If step S30 determines that the I/O advice adapter is a single function I/O adapter 200, then step S36 causes the I/O adapter 200 to write, via direct memory access, the bridge interrupt status register 420 to the system main storage 120 at the location 140 determined by the interrupt status shadow address register 410. Then, step S40 causes the I/O adapter 200 to send interrupt signal 230 (eg. PCI interrupt A) to the processor complex 100.

In Step S50, the processor complex 100 receives the interrupt signal, determines which I/O adapter 200, 500 send the interrupt, copies the interrupt status from the main storage 120 interrupt status shadow location 130, 140, or 160 and sets that shadow location to zero. Then, decision step S70 decides whether the I/O adapter is a multifunction I/O adapter 500. If yes, then step S72 causes the processor complex 100 to reset the interrupt condition in the I/O adapter function interrupt summary register 520. Afterwards, step S74 determines whether the bridge interrupt set in the function interrupt summary register 520 is for a function or device connected to the multifunction I/O adapter 500. If not, then process other function interrupt status register 520 status bits in step S76; otherwise, step S80 causes the processor complex 100 to read the I/O adapter interrupt status register 420 for the function.

If step S70 determines that the I/O adapter is a single function I/O adapter 200, then step S78 causes the processor complex 100 to rest the interrupt condition in the I/O adapter bridge interrupt status register 420. Thereafter, step S90 causes the processor complex 100 to read the I/O adapter bridge interrupt status register 420.

After steps S80 and S90, step S100 decides whether there is an interrupt set in the bridge status of the bridge interrupt status register 420. If yes, then step S102 reads the device interrupt status register 220 to process its status for each I/O adapter 200 connected to the bridge device 400. If no, then step S104 processes other bridge interrupt conditions.

After steps S102 and S104, step S110 then determines whether the I/O adapter 200 is a multifunction device 500. If yes, then step S120 further determines whether the bridge interrupt set in the function interrupt status register shadow 150 is for another function. If yes, then the process loops back to S80 to repeat the process for the other function. If no, then the process returns to the idle state in step S2. The idle state is also reached if step S110 determines that the I/O adapter is a single function I/O adapter 200.

The invention may also utilize known masking techniques to suppress an interrupt status in the device interrupt status register 220 or function interrupt summary register 520. For example, during initialization masking may be utilized. The invention may also utilize a clear masking technique to clear a mask previously set as known in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An I/O adapter device adapting an I/O adapter to an I/O system having a processor complex including a processing unit, main memory connected to the processing unit, and a bus interconnecting the processor complex and said I/O adapter device; said I/O adapter device comprising:

a device interrupt status register storing an interrupt status of the I/O adapter, wherein the interrupt status includes an operating status of the I/O adapter, an interrupt status shadow address register storing an address in the main memory at which the interrupt status stored in said device interrupt status register is shadowed, and interrupt decision logic sending a interrupt signal to the processor complex after the device interrupt status register is shadowed to the interrupt status shadow address in the main memory indicated by said interrupt status shadow address register wherein the address in the main memory at which the interrupt status is shadowed is a variable address that varies according to a particular I/O adapter used for the I/O adapter.

2. The I/O adapter device according to claim 1, wherein the processor complex switches context from an application handling state to an I/O handling state upon receipt of the interrupt signal from said I/O adapter device, and then accesses the interrupt status shadow address to determine the interrupt status of the I/O adapter device.

3. The I/O adapter device according to claim 1, wherein said I/O adapter device is a multifunction I/O adapter having a plurality of I/O devices connected thereto, said multifunction I/O adapter further including:

one of said device interrupt status registers for each I/O adapter connected thereto, and a function interrupt summary register summarizing the interrupt status for each of said device interrupt status registers, a second interrupt status shadow address register storing an address in the main memory at which the summarized interrupt status stored in said function interrupt summary register is shadowed, said interrupt decision logic sending an interrupt signal interrupting the processor complex after the function interrupt summary register is shadowed to the second interrupt status shadow address in the main memory.

4. The multifunction I/O adapter according to claim 3, further comprising:

a bridge device connected to said multifunction I/O adapter and bridging between the bus and a secondary bus to which a second I/O adapter is connected, said bridge device including a bridge interrupt status register storing an interrupt status of the bridge and an interrupt status of the second I/O adapter, said function interrupt summary register summarizing the interrupt status for each of said device interrupt status registers and the bridge interrupt status register.

5. The I/O adapter device according to claim 1, further comprising:

a bridge device bridging between the bus and a secondary bus to which a second I/O adapter is connected, said bridge device including a bridge interrupt status register storing an interrupt status of the bridge and an interrupt status of the second I/O adapter, a second interrupt status shadow address register storing an address in the main memory at which the bridge interrupt status stored in said bridge interrupt status register is shadowed, said interrupt decision logic sending an interrupt signal interrupting the processor complex after the bridge interrupt status register is shadowed to the second interrupt status shadow address in the main memory.

6. A hierarchically organized interrupt status determining and signalling structure for an I/O system having a host system, an I/O bus, a multifunction I/O adapter connected to the I/O bus, and a plurality of I/O adapters connected to the multifunction I/O adapter, comprising:

a device interrupt status register for each of the plurality of I/O adapters, said device interrupt status register containing an interrupt status of a corresponding I/O adapter, wherein the interrupt status includes an operating status of the corresponding I/O adapter, a function interrupt summary register summarizing the interrupt status of each device interrupt status register to summarize the interrupt status of each I/O device connected to the multifunction I/O adapter, an interrupt status shadow address in a memory of the host system storing a shadowed copy of the function interrupt summary register, interrupt decision logic sending an interrupt signal to the processor complex after the function interrupt summary register is shadowed to the interrupt status shadow address in the host system memory.

7. The hierarchically organized interrupt status determining and signalling structure according to claim 6 for an I/O system including a bridge device bridging between the bus and a secondary bus to which a second I/O adapter is connected, said hierarchically organized interrupt status determining and signalling structure further comprising:

a bridge interrupt status register storing an interrupt status of the bridge device and an interrupt status of the second I/O adapter, said function interrupt summary register summarizing the interrupt status for each of said device interrupt status registers and the bridge interrupt status register.

8. An I/O system, comprising:
a processor complex including
a processing unit capable of switching context between an I/O adapter handling state and an application program handling state,
main memory connected to the processing unit said main memory including an interrupt status shadow address storing a shadowed copy of an interrupt status from an I/O adapter device,
a bus interconnecting said processor complex and said I/O adapter device;
said I/O adapter device having an I/O adapter attached thereto, said I/O adapter device including
a device interrupt status register storing an interrupt status of an I/O adapter connected to the I/O adapter device, wherein the interrupt status includes an operating status of the I/O adapter,
said device interrupt status register being shadowed to the interrupt status shadow address in said main memory, and
interrupt decision logic sending an interrupt signal to the processor complex after the device interrupt status register is shadowed to the interrupt status shadow address in said main memory,
said processor complex receiving the interrupt signal, switching context from the application handling state to the I/O handling state, and then accessing the interrupt status shadow address to determine the interrupt status.

9. The I/O system according to claim 8, further comprising:
a host bridge device interconnecting said bus and said processor complex, said host bridge device storing and forwarding the interrupt status from the device interrupt status register to the interrupt status shadow address in said main memory.

10. A method of adapting an I/O adapter to an I/O system having a processor complex including a processing unit, main memory connected to the processing unit and a bus interconnecting the processor complex and I/O adapter to which the I/O adapter is connected; said I/O adapting method comprising the steps of:
storing an interrupt status of the I/O adapter in the I/O adapter,
shadowing the interrupt status stored in said storing step to an interrupt status shadow address of the main memory, wherein the interrupt status includes an operating status of the I/O adapter, and
sending an interrupt signal to the processor complex after said shadowing step is completed,
wherein the interrupt status shadow address varies according to a particular I/O adapter connected to the I/O system.

11. The I/O adapting method according to claim 10, further comprising the steps of:
switching a context of the processor complex from an application handling state to an I/O handling state after receiving the interrupt signal send in said sending step;
accessing the interrupt status shadow address to determine the interrupt status of the I/O adapter.

12. The I/O adapting method according to claim 10, wherein the I/O adapting method is a multifunction I/O adapting method such that the I/O adapter is a multifunction I/O adapter having a plurality of I/O adapters connected thereto;
said storing step storing an interrupt status of each of the I/O adapters connected to the multifunction I/O adapter in the multifunction I/O adapter,
the multifunction I/O adapting method further comprising the steps of:
summarizing the interrupt status of each of the I/O adapters stored in said storing step,
shadowing the summarized interrupt status summarized in said summarizing step to an function interrupt status shadow address of the main memory, and
sending an interrupt signal to the processor complex after said shadowing step is completed.

13. The multifunction I/O adapting method according to claim 12, further comprising the steps of:
connecting a bridge device to the multifunction I/O adapter bridging between the bus and a secondary bus to which a second I/O adapter is connected,
storing an interrupt status of the bridge and an interrupt status of the second I/O adapter,
said summarizing step summarizing the interrupt status of the bridge device and for each of the I/O adapters connected to the multifunction I/O adapter.

14. The I/O adapting method according to claim 10, further comprising the steps of:
connecting a bridge device bridging between the bus and a secondary bus to which a second I/O adapter is connected,
storing an interrupt status of the bridge and an interrupt status of the second I/O adapter in the bridge device,
shadowing the interrupt status stored in said storing step to a bridge interrupt status shadow address of the main memory.

15. A hierarchically organized interrupt status determining and signalling method for an I/O system having a host system, an I/O bus, a multifunction I/O adapter connected to the I/O bus, and a plurality of I/O adapters connected to the multifunction I/O adapter, comprising:
storing an interrupt status of each I/O adapter connected to the multifunction I/O adapter in corresponding device interrupt status registers, wherein the interrupt status includes an operating status of the corresponding I/O adapter,
summarizing the interrupt status of each device interrupt status register to summarize the interrupt status of each I/O adapter connected to the multifunction I/O adapter,
shadowing the summarized interrupt status summarized in said summarizing step to an function interrupt status shadow address of the main memory, and
sending an interrupt signal to the processor complex after said shadowing step is completed.

16. The hierarchically organized interrupt status determining and signalling method according to claim 15 for an I/O system including a bridge device bridging between the bus and a secondary bus to which a second I/O adapter is connected, said hierarchically organized interrupt status determining and signalling method further comprising the steps of:
storing an interrupt status of the bridge device and an interrupt status of the second I/O adapter in the bridge device,
summarizing step summarizing the interrupt status for each of said device interrupt status registers and the bridge interrupt status register.

17. The I/O system according to claim 8, wherein the interrupt status shadow address varies according to a particular I/O adapter device used for the I/O adapter device.

* * * * *